United States Patent Office 3,509,130
Patented Apr. 28, 1970

3,509,130
2-AMINO-1-BENZAZEPINES
William Laszlo Bencze, New Providence, N.J., assignor to Ciba Corporation, New York, N.Y., a corporation of Delaware
No Drawing. Filed Dec. 9, 1966, Ser. No. 600,373
Int. Cl. C07d 41/08
U.S. Cl. 260—239                              13 Claims

ABSTRACT OF THE DISCLOSURE 2-amino-4,5-dihydro-1-benzazepines of the Formula I

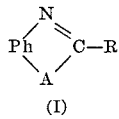
(I)

Ph=a 1,2-phenylene
A=lower alkylene or aralkylene separating Ph from C—R by 3 chain-carbon atoms
R=an amino group acyl derivatives, N-oxides, quaternaries and salts thereof, particularly the 2-n-propylamino-3-phenyl-7-methoxy-4,5-dihydro-1-benzazepine hydrochloride, exhibit hypoglycemic effects.

SUMMARY

The present invention concerns and has for its object the provision of new 2-amino-4,5-dihydro-1-benzazepines of the Formula I, in which Ph stands for a 1,2-phenylene radical, A for lower alkylene or carbo- or heterocyclic aralkylene separating Ph from C–R by 3 chain-carbon atoms and R for an amino group, N-acyl derivatives, N-oxides, quaternaries and salts thereof, as well as corresponding pharmaceutical compositions and methods for the preparation of the new compounds.

DESCRIPTION

The 1,2-phenylene radical Ph is unsubstituted or substituted by one or more than one of the same or different substituents attached to any of the positions available for substitution. Such substituents are, for example, lower alkyl, such as methyl, ethyl, n- or i-propyl or -butyl, free, etherified or esterified hydroxy or mercapto, for example, lower alkoxy, alkylenedioxy or alkylmercapto, such as methoxy, ethoxy, n- or i-propoxy or -butoxy, methylenedioxy, 1,1- or 1,2-ethylenedioxy, methyl- or ethylmercapto, halogen, such as fluoro, chloro or bromo, trifluoromethyl, nitro or amino, such as di-lower alkylamino, e.g., dimethylamino or diethylamino. Preferred substituted 1,2-phenylene radicals are (lower alkyl)-1,2-phenylene, (lower alkoxy)-1,2-phenylene, (lower alkylmercapto)-1,2-phenylene, (halogeno)-1,2-phenylene, (trifluoromethyl)-1,2-phenylene and (di-lower alkylamino)-1,2-phenylene.

The lower alkylene radical A preferably stands for 1,3-propylene, but also for 2-methyl-1,3-propylene, 1,3-butylene, 1,3- or 2,4-pentylene, 1,3- or 2,4-hexylene, 1,3-2,4- or 3,5-heptylene. A corresponding aralkylene radical contains preferably a monocyclic carbocyclic, but also a heterocyclic aryl radical attached to one of the chain-carbon atoms of the above alkylene radical, preferably to those adjacent to Ph or especially C–R. Said carbocyclic aryl, i.e., phenyl radical is unsubstituted or substituted as shown for Ph. The heterocyclic aryl radical preferably contains one heteroatom, e.g., nitrogen or sulfur atom only and represents, therefore, preferably pyridyl or tienyl.

The amino group R preferably is a secondary amino group and contains, more particularly, aliphatic or araliphatic radicals, for example, lower alkyl or alkenyl, such as the alkyls mentioned above, but also straight or branched pentyl, hexyl or heptyl bound in any position, or allyl, methallyl, 2- or 3-butenyl or farnesyl, furthermore, cycloalkyl, cycloalkenyl, cycloalkyl-lower alkyl or cycloalkenyl-lower alkyl containing preferably 3 to 6 ring-carbon atoms, such as cyclopropyl, cyclopentyl, cyclohexyl or cycloheptyl, 3-cyclopentenyl, 2- or 3-cyclohexenyl, cyclopropylmethyl, cyclopentyl-methyl, 2-cyclopentyl-ethyl, cyclohexyl-methyl, 2-cyclohexyl-ethyl or 3 - cyclopropyl-propyl, 3 - cyclopentenyl-methyl, 2 - cyclopent-3-enyl-ethyl, 3-cyclohexenyl-methyl or 2-cyclohex-3-enyl-ethyl, aralkyl or aralkenyl, preferably phenyl-lower alkyl or alkenyl, such as benzyl, 1- or 2-phenyl-ethyl or cinnamyl. These radicals are unsubstituted or substituted by one or more than one of the same or different substituents, in the aromatic portion, for example, by those mentioned for the 1,2-phenylene radical Ph and/or in the aliphatic portion preferably by free, etherified or esterified hydroxy or mercapto which is separated from the nitrogen atom by at least 2- carbon atoms, such as the above-mentioned lower alkoxy or alkylmercapto, or by lower alkanoyloxy, e.g., acetoxy, propionyloxy, butyryloxy or pivalyloxy. Such substituted aliphatic radicals are preferably the following: 2-hydroxy- or mercapto-ethyl, -propyl or -butyl, 3-hydroxy-or mercapto-propyl, -butyl or -pentyl, 4-hydroxy-or mercapto-butyl, -pentyl or -hexyl; 2,3-dihydroxy-propyl or -butyl or 3,4-dihydroxy-butyl or -pentyl; the corresponding hydroxy-alkyl groups fully or partially etherified by lower alkyl or esterified with a lower alkanoic acid.

The N-acyl derivatives are preferably those of aliphatic, araliphatic or aromatic carboxylic acids, such as lower alkanoic, alkenoic, phenylalkanoic, phenylalkenoic or benzoic acids, such as acetic, propionic, butyric, pivalic, acrylic, methacrylic, phenylacetic, cinnamic or benzoic acid; which may be substituted, especially in the aromatic portion, as shown for Ph.

The quaternaries are, for example, those containing additional N-lower alkyl or aralkyl groups, e.g., those mentioned above.

The compounds of the invention exhibit valuable pharmacological properties. Apart from stimulating and diuretic effects, they show primarily hypoglycemic activity, as can be demonstrated in animal tests using, for example mammals, e.g., mice or rats, as test objects. They are, therefore, particularly useful as orally applicable hypoglycemic agents in the treatment of diabetes. Furthermore, they are useful intermediates in the preparation of other valuable, especially of pharmacologically active compounds.

Particularly useful are compounds of the Formula II

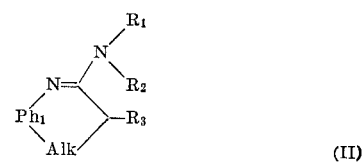
(II)

in which $Ph_1$ is 1,2-phenylene, (lower alkyl)-1,2-phenylene, (lower alkoxy)-1,2-phenylene or (halogeno)-1,2-phenylene, $R_1$ is lower alkyl, lower alkenyl, hydroxy-lower alkyl, lower alkoxy-lower alkyl, lower alkanoyloxy-lower alkyl, cycloalkyl, cycloalkenyl, cycloalkyl-lower alkyl and cycloalkenyl-lower alkyl with 3 to 6 ring-carbon atoms, $R_4$-lower alkyl or $R_4$-lower alkenyl, $R_2$ is hydrogen or lower alkanoyl, each of $R_3$ and $R_4$ is phenyl, (lower alkyl)-phenyl, (lower alkoxy)-phenyl or (halogeno)-phenyl and alk is lower alkylene separating the adjacent carbon atoms by 2 chain-carbon atoms, and acid addition salts thereof.

Especially valuable are those of Formula III

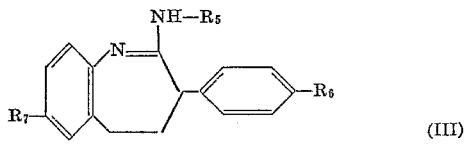

(III)

in which $R_5$ is methyl, ethyl, propyl, 2-methoxy-ethyl, 3-methoxypropyl, cyclopropyl and benzyl and each of $R_6$ and $R_7$ is hydrogen, methoxy or chloro, and therapeutically acceptable acid addition salts thereof which, when given to rats at oral doses between about 10 and 150 mg./kg., show outstanding hypoglycemic effects.

The compounds of the invention are prepared by methods in themselves known, for example, the process consists in reacting a relatively etherified 2-hydroxy- or mercapto-4,5-dihydrobenzazepine with ammonia, a primary or secondary amine and, if desired, converting a resulting compound into another compound of the invention.

A reactive ether used in the above reaction, preferably is a lower alkyl or aralkyl ether. Advantageously the 2-alkylmercapto-compounds are used as starting material.

The compounds of the invention so obtained may be converted into each other by methods in themselves known. Thus, for example, a primary or secondary amine obtained may be converted into a secondary or tertiary amine by reaction with a reactive ester of a corresponding alcohol, such as a halide or sulfonate, e.g., alkane or benzene sulfonate, or converted into an acyl derivative by reaction with a reactive functional acid derivative, such as a halide or anhydride. Resulting hydroxy alkyl compounds can analogously be etherified or esterified or resulting esters hydrolyzed or transesterified. The N-oxides are obtained, for example, by reacting resulting tertiary amines with hydrogen peroxide or a peracid, e.g., peracetic, perbenzoic or monoperphthalic acid, and the quaternaries by reacting a tertiary amine with a reactive ester of an alcohol, preferably that of a lower alkanol and a hydrohalic acid.

The above-mentioned reactions are carried out according to standard conditions, i.e., in the presence or absence of diluents, preferably such as are inert to the reagents and are solvents thereof, of catalysts, condensing agents and/or inert atmospheres, at atmospheric or superatmospheric pressure, at low temperatures, room temperature or elevated temperatures.

The compounds of the invention are obtained in the free form or in the form of their salts, depending on the conditions under which the process is carried out; the salts are also included in the present invention. Salts that are obtained can be converted into the free bases in known manner, for example, with alkalis or ion exchangers. Free bases that are obtained can be converted into salts by reaction with inorganic or organic acids, especially those that are suitable for the formation of therapeutically useful salts. Such acids are, for example, hydrohalic acids, e.g., hydrochloric or hydrobromic acid, sulfuric, phosphoric, nitric or perchloric acid, aliphatic, alicyclic, araliphatic, aromatic or heterocyclic carboxylic or sulfonic acids, for example, formic, acetic, propionic, succinic, glycollic, lactic, malic, tartaric, citric, ascorbic, maleic, hydroxymaleic, pyroracemic, phenylacetic benzoic, aminobenzoic, anthranilic, hydroxybenzoic, salicylic, aminosalicylic, embonic, nicotinic, methanesulfonic, ethanesulfonic, hydroxyethanesulfonic, ethylenesulfonic, halogebenzenesulfonic, toluenesulfonic, naphthalenesulfonic and sulfanilic acid; methionine, tryptophan, lysine and arginine.

These or other salts, for example, the picrates, can also be used for purification of the bases obtained; the bases are converted into salts, the salts are separated and the bases liberated from the salts. In view of the close relationship between the free compounds and the compounds in the form of their salts, whenever a free base is referred to in this context, a corresponding salt is also intended, provided such is possible or appropriate under the circumstances.

The invention further includes any variant of the present process, in which an intermediate product obtainable at any stage of the process is used as starting material and any remaining steps are carried out, or the process is discontinued at any stage thereof, or in which the starting materials are formed under the reaction conditions, or in which the reaction components are used in the form of their salts. Mainly, those starting materials should be used in the above process that lead to the formation of those compounds indicated above as being specially valuable.

The starting materials are known, or if they are new, may be prepared by methods in themselves known. Advantageously, they are obtained by converting 1,2,3,4-tetrahydro-naphthalen-1-ones according to the Schmidt-reaction into corresponding 1,2,4,5-tetrahydro-1-benzazepin-2-ones, which may be directly converted into the corresponding cyclic imino-ethers by treatment with an etherifying agent in the presence of a Lewis acid, or converted into the corresponding 2-thiones by reaction with phosphorus pentasulfide. The latter can easily be converted into the desired cyclic imino-thioethers by the usual etherification procedures, e.g., reaction with reactive esters of alcohols, e.g., halides or sulfates, under alkaline conditions.

The compounds of the invention can be used, for example, for the manufacture of pharmaceutical compositions containing them in conjunction or admixture with inorganic or organic, solid or liquid pharmaceutical excipients, suitable for enteral or parenteral administration. Suitable excipients are substances that do not react with the compounds of the invention, for example, water, gelatine, sugars, e.g. lactose, glucose or sucrose, starches, e.g., corn starch or arrowroot, stearic acid or salts thereof, e.g., magnesium or calcium stearate, talc, vegetable fats or oils, gums, alginic acid, benzyl alcohols, glycols and other known excipients. The compositions may be, for example, in solid form as tablets, dragees or capsules, or in liquid form a solutions, suspensions or emulsions. They may be sterilized and/or contain adjuvants, such as preserving, stabilizing, wetting or emulsifying agents, solution promoters, salts for regulating the osmostic pressure and/or buffers. They may further contain other therapeutically valuable substances. Said pharmaceutical compositions are prepared by conventional methods and contain about 0.1 to 75%, more particularly 1 to 50%, of the active ingredient. They are also included within the scope of the present invention.

The following examples are intended to illustrate the invention. Temperatures are given in degrees centigrade, and all parts wherever given are parts by weight.

EXAMPLE 1

The mixture of 5.2 g. 2-methylmercapto-3-phenyl-4,5-dihydro-1-benzazepine, 10 ml. methylamine and 40 ml. anhydrous ethanol is heated in a sealed tube to 100° for 24 hours. It is then evaporated, the residue taken up in diethyl ether, the solution filtered, and the filtrate acidified with ethereal hydrochloric acid. The precipitate formed is filtered off and recrystallized from ethanol-diethyl ether to yield the 2-methylamino-3-phenyl-4,5-dihydro-1-benzazepine hydrochloride of the formula

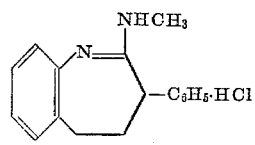

melting at 269–272°.

The starting material is prepared as follows: To the stirred mixture of 5.6 g. 2-phenyl-1,2,3,4-tetrahydro-naphthalen-1-one, 30 ml. acetic acid and 2.1 g. sodium azide, 6 ml. concentrated sulfuric acid are added dropwise within ½ an hour and below 40°. Hereupon the temperature is raised to 50° and maintained for ½ an hour. The mixture is then allowed to stand at room temperature for 2 hours and poured into 500 ml. 10% aqueous sodium carbonate while cooling. The precipitate formed is filtered off, washed with water and taken up in ethyl acetate-methylene chloride (1:1). The solution is dried, filtered, the filtrate evaporated and the residue recrystallized from ethanol-petroleum ether to yield the 3-phenyl-1,2,4,5-tetrahydro-benzepin-2-one melting at 196–198°.

The mixture of 4.7 g. thereof, 4.2 g. phosphorus pentasulfide and 30 ml. pyridine is refluxed for 1 hour and poured into 100 ml. hot water. After cooling the precipitate formed is filtered off and recrystallized from chloroform-diethyl ether to yield the 3-phenyl-1,2,4,5-tetrahydro-1-benzazepin-2-thione melting at 222–223°.

7.2 g. thereof are dissolved in 150 ml. dimethyl sulfoxide and 165 ml. mtehanol and to the stirred solution 36 ml. 1 N aqueous sodium hydroxide are added followed by 4.2 g. dimethyl sulfate in 15 ml. methanol. The mixture is stirred for 3 hours and allowed to stand overnight at room temperature. It is filtered, the filtrate evaporated in vacuo, the residue taken up in water and extracted with diethyl ether. The extract is washed with brine, dried, filtered, evaporated, the residue triturated with pentane and recrystallized from hexane and aqueous ethanol to yield the 2-methylmercapto-3-phenyl-4,5-dihydro-1-benzazepine melting at 66–70°.

EXAMPLE 2

The mixture of 5.1 g. 2-ethoxy-3-phenyl-4,5-dihydro-1-benzazepine, 10 ml. ethylamine and 40 ml. anhydrous ethanol is heated in a sealed tube to 135° for 2 days. It is then evaporated, the residue taken up in diehtyl ether, the solution filtered and the filtrate acidified with ethereal hydrochloric acid while cooling. The precipitate formed is filtered off and recrystallized from ethanol-diethyl ether to yield the 2-ethylamino-3-phenyl-4,5-dihydro-1-benzazepine hydrochloride of the formula

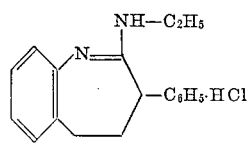

melting at 264–267°.

The starting material is prepared as follows: The mixture of 4.6 g. 3-phenyl-1,2,4,5-tetrahydro-1-benzazepin-2-one, 6.1 g. triethoxyboron tetrafluoride and 150 ml. methylene chloride is refluxed and stirred for 2 hours. After standing overnight at room temperature, it is concentrated to 20 ml. and diluted with diethyl ether. The precipitate formed is filtered off, taken up in methylene chloride and the solution shaken with aqueous potassium carbonate. The organic layer is evaporated and the residue recrystallized from petroleum ether to yield the 2-ethoxy-3-phenyl-4,5-dihydro-1-benzazepine melting at 88–90°.

EXAMPLE 3

The mixture of 3.9 g. 2-methylmercapto-3-phenyl-4,5-dihydro-1-benzazepine, 4.37 g. n-propylamine and 30 ml. anhydrous ethanol is heated in a sealed tube to 135° for 2 days. It is evaporated, the residue dissolved in diethyl ether, the solution filtered, the filtrate acidified with ethereal hydrochloric acid and the precipitate formed recrystallized from ethanol-diethyl ether to yield the 2-n-propylamino-2-phenyl-4,5-dihydro-1-benzazepine hydrochloride of the formula

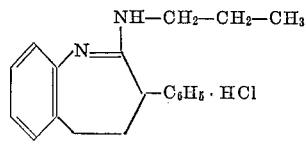

melting at 196–197°.

EXAMPLE 4

The mixture of 7.2 g. 2-methylmercapto-3-phenyl-7-methoxy-4,5-dihydro-1-benzazepine, 7.15 g. n-propylamine and 50 ml. anhydrous ethanol is heated in a sealed tube to 135° for 2 days. It is evaporated in vacuo, the residue taken up in diethyl ether, the solution acidified with ethereal hydrochloric acid and the precipitate formed recrystallized from ethanol-diethyl ether to yield the 2-n-propylamino - 3 - phenyl - 7 - methoxy - 4,5 - dihydro-1-benzazepine hydrochloride of the formula

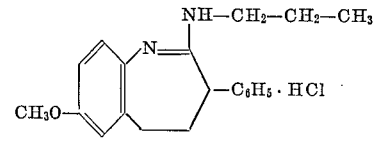

melting at 197–198°.

The starting material is prepared as follows: To the mixture of 25.2 g. 6-methoxy-2-phenyl-1,2,3,4-tetrahydro-naphthalen-1-one, 122 ml. acetic acid and 8.15 g. sodium azide, 23.7 ml. concentrated sulfuric acid are added while stirring and keeping the temperature below 55°, whereby the nitrogen evolution is moderate. Hereupon the mixture is heated to 60° for ½ an hour, then cooled and poured into 1 liter 10% aqueous sodium carbonate. It is extracted with ethyl acetate, the extract washed with aqueous bicarbonate and brine, dried and filtered. The residue is triturated with diethyl ether and recrystallized from aqueous ethanol to yield the 3-phenyl-7-methoxy-1,2,4,5-tetrahydro-1-benzazepin-2-one melting at 191–193°.

The mixture of 19.8 g. thereof, 16.3 g. phosphorus pentasulfide and 975 ml. pyridine is refluxed for 2 hours. Then half of the pyridine is distilled off and the remainder refluxed for another hour. The mixture is then poured into 950 ml. boiling water and the precipitate filtered off after cooling. It is recrystallized from aqueous ethanol to yield the 3-phenyl-7-methoxy-1,2,4,5-tetrahydro-1-benzazepin-2-thione melting at 208–209°.

To the mixture of 17.5 g. thereof, 340 ml. dimethyl sulfoxide and 370 ml. methanol, 80 ml. 1 N aqueous sodium hydroxide are added while stirring in an ice bath, followed by 9.3 g. dimethyl sulfate in 33 ml. methanol. The mixture is stirred at room temperature for 4 hours and evaporated. The residue is taken up in water, the mixture extracted with ethyl acetate, the extract swirled with brine, dried, filtered, and evaporated. The residue is distilled and the fraction boiling at 200–208°/0.15 mm. Hg collected; it represents the 2-methylmercapto-3-phenyl-7-methoxy-4,5-dihydro-1-benzazepine.

EXAMPLE 5

The mixture of 6.0 g. 2-methylmercapto-3-(4-chlorophenyl)-4,5-dihydro-1-benzazepine, 5.9 g. n-propylamine and 40 ml. anhydrous ethanol is heated to 135° for 2 days. It is evaporated in vacuo, the residue taken up in diethyl ether, the solution acidified with ethereal hydrochloric acid and the precipitate recrystallized from ethanol-diethyl ether to yield the 2-n-propylamino-3-(4-chlorophenyl)-4,5-dihydro-1-benzazepine hydrochloride of the formula

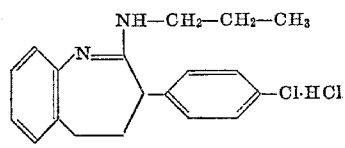

melting at 196–197°.

The starting material is prepared as follows: The mixture of 58.0 g. 2-(4-chloro-penyl)-1,2,3,4-tetrahydronaphthalen-1-one, 230 ml. glacial acetic acid and 18.9 g. sodium azide is heated to 50° while stirring. Then 44 ml. concentrated sulfuric acid are added dropwise at 62°, while keeping the nitrogen evolution moderate. The mixture is stirred at 65–70° for half an hour, cooled and poured into 2.25 liters 10° aqueous sodium carbonate. The precipitate formed is filtered off, dissolved in chloroform, the solution swirled with brine, dried and filtered through charcoal. To the filtrate pentane is added and the precipitate formed filtered off to yield the 3-(4-chlorophenyl)-1,2,4,5-tetrahydro-1-benzazepin-2-one melting at 195–197°.

The mixture of 21.6 g. thereof, 17.5 g. phosphorus pentasulfide and 1.05 liter pyridine is refluxed for 1½ hours. Then half of the pyridine is distilled off and the remainder refluxed for an additional hour. The mixture is poured into 1 liter boiling water, the precipitate filtered off after cooling, washed with water and recrystallized from aqueous ethanol to yield the 3-(4-chloro-phenyl)-1,2,4,5-tetrahydro-1-benzazepin-2-thione melting at 267–270°.

To the solution of 23.7 g. thereof in 456 ml. dimethyl sulfoxide and 486 ml. methanol, 106 ml. 1 N aqueous sodium hydroxide are added dropwise while stirring in an ice bath, followed by 12.4 g. dimethylsulfate in 43.6 ml. methanol. The mixture is stirred at room temperature for 4 hours and evaporated in vacuo. The residue is taken up in water, extracted with ethyl acetate, the extract swirled with brine, dried, filtered, and evaporated in vacuo. The residue is distilled and the fraction boiling at 170–182°/0.2 mm. Hg collected, to yield the 2-methylmercapto-3-(4-chloro-phenyl)-4,5-dihydro-1-benzazepine.

In the analogous manner the 2-n-propylamino-3-phenyl-7 - chloro - 4,5 - dihydro - 1 - benzazepine hydrochloride hemihydrate is prepared, showing in the IR-spectrum inter alia a strong band at 3518 cm.$^{-1}$. The corresponding starting material is prepared from the 3-phenyl-7-chloro-1,2,4,5-tetrahydro-1-benzazepin-2-one melting at 248–250°.

EXAMPLE 6

The mixture of 4.0 g. 2-methylmercapto-3-(4-chloro-phenyl)-4,5-dihydro-1-benzazepine, 5.9 g. 3-methoxy-propylamine and 25 ml. anhydrous ethanol is heated in a sealed tube to 135° for 2 days. It is evaporated, the residue dissolved in diethyl ether, the solution filtered, the filtrate acidified with ethereal hydrochloric acid and the precipitate recrystallized from acetone-diethyl ether to yield the 2-(3-methoxy-propylamino)-3-(4-chloro-phenyl)-4,5-dihydro-1-benzazepine hydrochloride of the formula

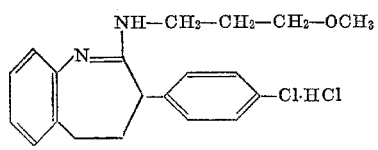

melting at 159–162°.

EXAMPLE 7

The mixture of 7.2 g. 2-methylmercapto-3-phenyl-7-methoxy-4,5-dihydro-1-benzazepine, 6.9 g. cyclopropylamine and 50 ml. anhydrous ethanol is heated in a sealed tube to 135° for 2 days. It is evaporated, the residue taken up in diethyl ether, the solution acidified with ethereal hydrochloric acid, the precipitate formed triturated with acetone and recrystallized from ethanol-diethyl ether to yield the 2-cyclopropylamino-3-phenyl-7-methoxy-4,5-dihydro-1-benzazepine hydrochloride of the formula

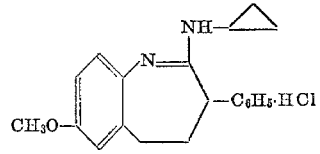

melting at 258–262°.

EXAMPLE 8

The mixture of 5.4 g. 2-methylmercapto-4,5-dihydro-1-benzazepine, 15.1 g. benzylamine and 60 ml. anhydrous ethanol is heated in a sealed tube to 135° for 2 days. It is evaporated in vacuo, the residue taken up in diethyl ether, the solution dried, filtered, evaporated and the residue recrystallized from aqueous ethanol and benzene-pentane to yield the 2-benzylamino-4,5-dihydro-1-benzazepine of the formula

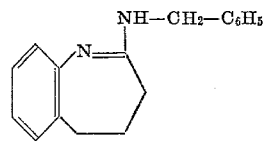

melting at 124–125°. The corresponding hydrochloride melts at 248–250°.

EXAMPLE 9

The mixture of 6.0 g. 2-methylmercapto-3-(4-chlorophenyl)-4,5-dihydro-1-benzazepine, 10.7 g. benzylamine and 40 ml. anhydrous ethanol is heated in a sealed tube to 135° for 2 days. It is evaporated in vacuo, the residue dissolved in diethyl ether, the solution acidified with ethereal hydrochloric acid, the precipitate formed filtered off and washed with acetone. The filtrate is evaporated and the residue recrystallized from ethanol-diethyl ether to yield the 2-benzylamino-3-(4-chloro-phenyl)-4,5-dihydro-1-benzazepine hydrochloride of the formula

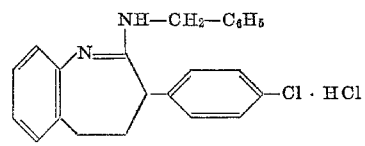

melting at 220–221°.

EXAMPLE 10

The mixture of 2.2 g. 2-methylmercapto-5-phenyl-4,5-dihydro-1-benzazepine, 2.46 g. n-propylamine and 17 ml. anhydrous ethanol is heated in a sealed tube to 135° for 2 days. It is evaporated in vacuo, the residue taken up in diethyl ether, the solution filtered, the filtrate acidified with ethereal hydrochloric acid, the precipitate formed filtered off and recrystallized from ethanol-diethyl ether to yield the 2-n-propylamino-5-phenyl-4,5-dihydro-1-benzazepin hydrochloride of the formula

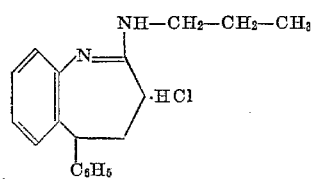

melting at 210–212°.

The starting material is prepared as follows: The mixture of 8.7 g. 5-phenyl-1,2,4,5-tetrahydro-1-benzazepin-2-one, 7.9 g. phosphorus pentasulfide and 525 ml. pyridine is refluxed for 2 hours. Then half of the pyridine is distilled off and the mixture refluxed for an additional hour. It is poured into 256 ml. boiling water and the precipitate formed filtered off after cooling. It is recrystallized from ethanol to yield the 5-phenyl-1,2,4,5-tetrahydro-1-benzazepin-2-thione melting at 192–193°.

4.1 g. thereof are dissolved in 88.5 ml. dimethylsulfoxide and 95 ml. methanol and to the stirred solution 20.6 ml. 1 N aqueous sodium hydroxide are added dropwise followed by 2.4 g. dimethyl sulfate in 9.5 ml. methanol. The mixture is stirred for 4 hours at room temperature, evaporated in vacuo, and the residue taken up in water. The mixture is extracted with diethyl ether, the extract washed with brine, dried, filtered and evaporated. The residue is triturated with pentane and recrystallized from benzenehexane to yield the 2-methylmercapto-5-phenyl-4,5-dihydro-1-benzazepine melting at 176.5–177°.

EXAMPLE 11

The mixture of 4.0 g. 2-methylmercapto-5-phenyl-4,5-dihydro-1-benzazepine, 8.0 g. benzylamine and 31 ml. anhydrous ethanol is heated in a sealed tube to 135° for 2 days. It is evaporated in vacuo, the residue dissolved in diethyl ether, the solution acidified with ethereal hydrochloric acid and the precipitate filtered off. It is washed with water and recrystallized from ethanol-diethyl ether and acetone-diethyl ether to yield the 2-benzylamino-5-phenyl-4,5-dihydro-1-benzazepine hydrochloride of the formula

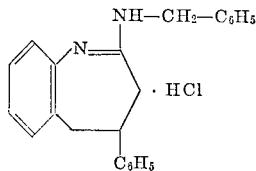

melting at 183–185°.

EXAMPLE 12

In the manner described in the previous examples:

the 2-n-propylamino-3-(3-pyridyl)-4,5-dihydro-1-benzazepine dihydrochloride, the 2-n-propylamino-3-methyl-3-(3-pyridyl)-4,5-dihydro-1-benzazepine dihydrochloride, the 2-n-propylamino-3-ethyl-3-phenyl-4,5-dihydro-1-benzazepine hydrochloride, the 2 - n-propylamino-3-(2-chloro-phenyl)-4,5-dihydro-1-benzazepine hydrochloride, the 2-n-propylamino-3-phenyl-8-chloro-3,4-dihydro-1-benzazepin hydrochloride, the 2 - n-propylamino-3-(4-methyl-phenyl)-4,5-dihydro-1-benzazepine hydrochloride and the 2 - n - propyl - 3-(3-chlorophenyl)-4,5-dihydro-1-benzazepine hydrochloride are prepared from the 3-(3-pyridyl) - 1,2,4,5 - tetrahydro-1-benzazepin-2-one M.P. 180–185°, the 3 - methyl - 3-(3-pyridyl)-1,2,4,5-tetrahydro-1-benzazepin-2-one M.P. 226–228°, the 3-ethyl-3-phenyl-1,2,4,5-tetrahydro-1-benzazepin-2-one M.P. 200–202°, the 3 - (2 - chloro-phenyl)-1,2,4,5-tetrahydro-1-benzazepin-2-one M.P. 240–242°, the 3-phenyl-8-chloro-1,2,4,5-tetrahydro-1-benzazepin-2-one M.P. 224–227°, the 3-(4-methyl-phenyl) - 1,2,4,5 - tetrahydro-1-benzazepin-2-one M.P. 193–194°, and the 3-(3-chloro-phenyl)-1,2,4,5-tetrahydro-1-benzazepin-2-one M.P. 204–207°, respectively.

I claim:

1. A member selected from the group consisting of the compound having the formula

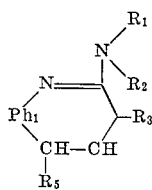

in which $Ph_1$ is a member selected from the group consisting of 1,2-phenylene, (lower alkyl)-1,2-phenylene, (lower alkoxy)-1,2-phenylene and (halogeno)-1,2-phenylene, $R_1$ is a member selected from the group consisting of lower alkyl, lower alkoxy-lower alkyl, cycloalkyl with 3 to 6 ring-carbon atoms and $R_5$-lower alkyl, $R_2$ is a member selected from the group consisting of hydrogen and lower alkanoyl, both of $R_3$ and $R_4$ are hydrogen or one thereof is hydrogen and the other, as well as $R_5$, is a member selected from the group consisting of phenyl, (lower alkyl)-phenyl, (lower alkoxy)-phenyl and (halogeno)-phenyl, in which radicals "lower" indicates the content of up to 4 carbon atoms and therapeutically acceptable acid addition salts thereof.

2. A compound as claimed in claim 1 and being a member selected from the group consisting of the compound having the formula

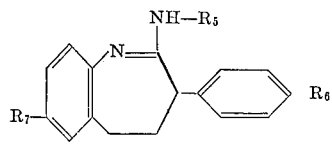

in which $R_5$ is a member selected from the group consisting of methyl, ethyl, propyl, 2-methoxy-ethyl, 3-methoxy-propyl, cyclopropyl and benzyl and each of $R_6$ and $R_7$ is a member selected from the group consisting of hydrogen, methoxy and chloro, and therapeutically acceptable acid addition salts thereof.

3. A compound as claimed in claim 1 and being the 2-methylamino-3-phenyl-4,5-dihydro-1-benzazepine hydrochloride.

4. A compound as claimed in claim 1 and being the 2 - ethylamino-3-phenyl-4,5-dihydro-1-benzazepine hydrochloride.

5. A compound as claimed in claim 1 and being the 2 - n-propylamino-3-phenyl-4,5-dihydro-1-benzazepine hydrochloride.

6. A compound as claimed in claim 1 and being the 2 - n - propylamino - 3 - phenyl - 7-methoxy-4,5-dihydro-1-benzazepine hydrochloride.

7. A compound as claimed in claim 1 and being the 2 - n - propylamino - 3 - (4-chloro-phenyl)-4,5-dihydro-1-benzazepine hydrochloride.

8. A compound as claimed in claim 1 and being the 2 - (3 - methoxy - propyl)-3-(4-chloro-phenyl)-4,5-dihydro-1-benzazepine hydrochloride.

9. A compound as claimed in claim 1 and being the 2 - cyclopropylamino - 3-phenyl-7-methoxy-4,5-dihydro-1-benzazepine hydrochloride.

10. A compound as claimed in claim 1 and being the 2 - benzylamino-4,5-dihydro-1-benzazepine hydrochloride.

11. A compound as claimed in claim 1 and being the 2 - benzylamino - 3 - (4 - chloro - phenyl)-4,5-dihydro-1-benzazepine hydrochloride.

12. A compound as claimed in claim 1 and being the 2 - n-propylamino-5-phenyl-4,5-dihydro-1-benzazepine hydrochloride.

13. A compound as claimed in claim 1 and being the 2-benzylamino-5-phenyl-4,5-dihydro-1-benzazepine hydrochloride.

References Cited

UNITED STATES PATENTS 3,205,222   9/1965   Johnson _____ 260—239

ALEX MAZEL, Primary Examiner

A. M. T. TIGHE, Assistant Examiner

U.S. Cl. X.R.

260—240, 295, 296, 329, 332.2, 332.3, 332.5; 424—200, 232, 266, 229, 274, 244

CASE SU-492

PO-1050
(5/69)

UNITED STATES PATENT OFFICE
CERTIFICATE OF CORRECTION

Patent No. 3,509,130                        Dated  April 28, 1970

Inventor(s)     WILLIAM LASZLO BENCZE

It is certified that error appears in the above-identified patent and that said Letters Patent are hereby corrected as shown below:

Column 9, claim 1, the formula should read

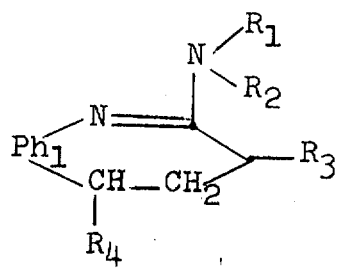

Column 10, claim 2, the "$R_6$" should be bonded in the 4-position of the 3-phenyl ring.

SIGNED AND SEALED
DEC 15 1970

(SEAL)
Attest:

Edward M. Fletcher, Jr.
Attesting Officer

WILLIAM E. SCHUYLER, JR.
Commissioner of Patents